United States Patent
Shoemaker

[11] 3,893,751
[45] July 8, 1975

[54] 40 X MICROSCOPE OBJECTIVE

[75] Inventor: Arthur H. Shoemaker, East Aurora, N.Y.

[73] Assignee: American Optical Corporation, Southbridge, Mass.

[22] Filed: Apr. 26, 1974

[21] Appl. No.: 464,383

[52] U.S. Cl. ........... 350/229; 350/175 ML; 350/176
[51] Int. Cl.[2] ....................... G02B 9/12; G02B 21/02
[58] Field of Search ..... 350/225, 229, 175 ML, 176

[56] References Cited
UNITED STATES PATENTS

| | | | |
|---|---|---|---|
| 3,552,830 | 1/1971 | Shoemaker | 350/225 X |
| 3,552,831 | 1/1971 | Shoemaker | 350/225 X |

*Primary Examiner*—John K. Corbin
*Attorney, Agent, or Firm*—Alan H. Spencer; William C. Nealon; H. R. Berkenstock, Jr.

[57] ABSTRACT

A three member microscope objective having a numerical aperture of substantially 0.66 and a magnification of substantially 40X provides a substantially flat image field of about 24mm.

2 Claims, 1 Drawing Figure

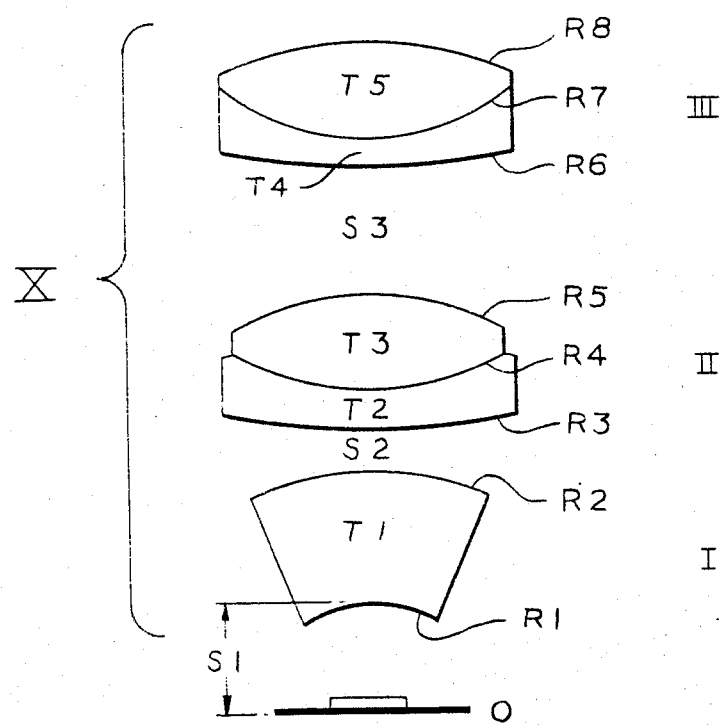

40 X MICROSCOPE OBJECTIVE

BACKGROUND OF THE INVENTION

The present invention relates to microscope objectives, and more particularly, to an achromatic microscope objective having a numerical aperture of substantially 0.66 and a magnification of substantially 40X, in which chromatic and spherical aberrations, coma, and astigmatism are well corrected while yet providing a substantially flat image field of about 24mm, when used with a telescope objective as described in U.S. Pat. No. 3,355,234.

DRAWING AND INVENTION

The drawing is an optical diagram of the microscope objective X having lens elements, I, II and III in optical alignment along an optical axis extending from object plane O. The first element I is a concavo-convex positive singlet; the second element II is a double convex positive doublet and the third element III is a double convex positive doublet. The parameters of objective X are set forth in Table I wherein the axial thicknesses of successive lens elements are designated T1 to T5, and the successive axial spaces from the object plane (designated O) are S1 to S3. The successive lens radii are designated R1 to R8 where the minus sign (−) applies to surfaces whose center of curvature lies on the object side of their vertices. The refractive indices and Abbe numbers of the glasses in the successive lenses are absolute fixed values designated ND(1) to ND(5) and $\nu(1)$ to $\nu(5)$ respectively and F is the focal length of the objective in millimeters.

TABLE I

| Lens | Radius | Thickness | Space | Refractive Index | Abbe Number |
|---|---|---|---|---|---|
| | | | $S_1$=0.1591F | | |
| I | $R_1$=− 0.5720F | $T_1$=0.7659F | | ND(1)=1.78833 | $\nu(1)$=50.47 |
| | $R_2$=−0.7315F | | $S_2$=0.0468F | | |
| | $R_3$= 4.1284F | $T_2$=0.3282F | | ND(2)=1.80491 | $\nu(2)$=25.42 |
| II | $R_4$ 1.2737F | | | | |
| | $R_5$=− 1.6057F | $T_3$=0.6565F | | ND(3)=1.69669 | $\nu(3)$=56.13 |
| | | | $S_3$=1.0865F | | |
| | $R_6$= 11.4873F | $T_4$=0.3282F | | ND(4)=1.80784 | $\nu(4)$=40.74 |
| III | $R_7$= 1.3057F | | | | |
| | $R_8$=− 3.2142F | $T_5$=0.6565F | | ND(5)=1.52241 | $\nu(5)$=59.50 |

A specific embodiment of the present invention is an objective with a focal length of 4.570mm and the optical values set forth in Table II.

TABLE II

| Lens | Radius | Thickness | Space |
|---|---|---|---|
| | | | $S_1$=0.7273 |
| I | $R_1$=− 2.614 | $T_1$=3.500 | |
| | $R_2$=− 3.343 | | |
| | | | $S_2$=0.214 |
| | $R_3$= 18.867 | $T_2$=1.500 | |
| II | $R_4$= 5.821 | | |
| | $R_5$=− 7.338 | $T_3$=3.000 | |
| | | | $S_3$=4.965 |
| | $R_6$= 52.497 | | |
| III | $R_7$= 5.967 | $T_4$=1.500 | |
| | $R_8$=−14.689 | $T_5$=3.000 | |

The values of the objective as stated herein are independent of normal manufacturing tolerances.

What is claimed is:

1. A microscope objective which is well corrected for chromatic image aberrations, spherical aberration, coma and astigmatism and has three elements aligned along an optical axis, which comprises a concavo-convex positive singlet I as a first element, a double convex positive doublet II as a second element and a double convex positive doublet III as a third element, said elements having the following optical parameters:

| Lens | Radius | Thickness | Space | Refractive Index | Abbe Number |
|---|---|---|---|---|---|
| | | | $S_1$=0.1591F | | |
| I | $R_1$=− 0.5720F | $T_1$=0.7659F | | ND(1)=1.78833 | $\nu(1)$=50.47 |
| | $R_2$= 0.7315F | | $S_2$=0.0468F | | |
| | $R_3$= 4.1284F | $T_2$=0.3282F | | ND(2)=1.80491 | $\nu(2)$=25.42 |
| II | $R_4$= 1.2737F | | | | |
| | $R_5$=− 1.6057F | $T_3$=0.6565F | | ND(3)=1.69669 | $\nu(3)$=56.13 |
| | | | $S_3$=1.0865F | | |
| | $R_6$= 11.4873F | $T_4$=0.3282F | | ND(4)=1.8078 | $\nu(4)$=40.74 |
| III | $R_7$= 1.3057F | | | | |
| | $R_8$=− 3.2142F | $T_5$=0.6565F | | ND(5)=1.52241 | $\nu(5)$=59.50 | wherein axial thicknesses of successive lens element are T1 to T5, successive axial spaces are S1 to S3, successive lens radii are R1 to R8 where − applies to surfaces whose center of curvature lies on the object side of the vertices, refractive indices and Abbe numbers of the successive lenses are ND(1) to ND(5), $\nu(1)$ to $\nu(5)$ respectively, and F is the focal length of the objective in millimeters.

2. The microscope objective of claim 1 wherein F is 4.570.

* * * * *